United States Patent [19]

Di Gianfilippo et al.

[11] Patent Number: 4,648,430
[45] Date of Patent: Mar. 10, 1987

[54] DEVICE AND METHOD FOR COLLECTING A DESIRED WEIGHT AMOUNT OF A MATERIAL

[75] Inventors: Aleandro Di Gianfilippo, Arlington Heights; Alan A. Figler, Algonquin; Leon Huang, Hoffman Estates; Donald Warner, Gurnee, all of Ill.

[73] Assignee: Baxter Travenol Laboratories, Inc., Deerfield, Ill.

[21] Appl. No.: 852,090

[22] Filed: Apr. 14, 1986

Related U.S. Application Data

[63] Continuation of Ser. No. 623,818, Jun. 22, 1984, abandoned.

[51] Int. Cl.$^4$ .............................................. B65B 3/28
[52] U.S. Cl. ......................................... 141/1; 141/83; 177/60
[58] Field of Search ................ 141/1, 83; 177/60, 122

[56] References Cited

U.S. PATENT DOCUMENTS

| | | | |
|---|---|---|---|
| 2,199,010 | 4/1940 | Robb | 177/3 |
| 3,306,495 | 2/1967 | Wabers | 222/77 |
| 4,182,383 | 1/1980 | Adomitis et al. | 141/5 |
| 4,222,496 | 9/1980 | Start et al. | 222/16 |
| 4,272,824 | 6/1981 | Lewinger et al. | 364/502 |
| 4,275,775 | 6/1981 | Egli | 141/83 |
| 4,320,855 | 3/1982 | Ricciardi et al. | 222/56 |
| 4,401,981 | 8/1983 | Figler | 340/715 |
| 4,408,640 | 10/1983 | Voza | 141/1 |
| 4,438,357 | 3/1984 | Wicnienski | 307/597 |
| 4,582,097 | 4/1986 | Izzi et al. | 141/1 |

FOREIGN PATENT DOCUMENTS 2640842 3/1978 Fed. Rep. of Germany ........ 141/83

OTHER PUBLICATIONS

"A Comparative Evaluation of Methods Used to Compound Parenteral Nutrition Solutions", Nutritional Support Services, vol. 3, #12, 12/83, by Robert R. McClendon, RPh.

Primary Examiner—Stephen Marcos
Assistant Examiner—Mark Thronson
Attorney, Agent, or Firm—Paul C. Flattery; Daniel D. Ryan; Kay H. Pierce

[57] ABSTRACT

A method and apparatus of collecting a desired end-point weight amount of material first conveys the material into the collection container until a predetermined weight amount is collected. The predetermined weight amount is less than the desired end-point weight amount by a selected initial weight offset amount. An additional incremental amount of material is next conveyed into the container for a predetermined fixed time period. In doing so, the method and apparatus gauge the particular flow characteristics of the associated flow system. A further additional incremental amount of material is conveyed into the collection container for another time period, the length of which reflects the anticipated flow characteristics of the system, based upon the performance of the system during the preceding period. The method and apparatus repeat this sequence until the then-existing weight amount equals or exceeds the desired end-point weight amount.

15 Claims, 4 Drawing Figures

DEVICE AND METHOD FOR COLLECTING A DESIRED WEIGHT AMOUNT OF A MATERIAL

This application is a continuation of application Ser. No. 623,818, filed June 22, 1984, now abandoned.

FIELD OF THE INVENTION

The invention pertains to methods and devices for delivering predetermined amounts of materials.

BACKGROUND AND OBJECTS OF THE INVENTION

In many environments, it is desirable to deliver or mix materials in relatively precise amounts. For example, in hospitals and pharmacies, syringes, medical containers, or other receptacles are routinely filled with precise amounts of parenteral fluids. In these and other areas, the performance of the material delivery system is measured in terms of its speed, accuracy, and reliability.

The speed, accuracy and reliability of conventional material delivery systems are dependent upon the particular performance characteristics of the associated pumping mechanisms, if any; the particular physical characteristics of the pathways which convey the material; and the nature of the material itself.

For example, in the case of conventional peristaltic pumping mechanism, which are in widespread use, the desired physical characteristics and tolerances of the tubing segments associated with the pump rotors can be initially controlled by following careful manufacturing methods. However, once in use, the dimensions and other physical characteristics of the tubing segments are subject to change; for example, due to repeated expansion and contraction by the peristaltic pump rotors or by temperature changes. These changes can introduce metering errors which are either random or change with time.

Furthermore, even though a given peristaltic pump may also provide consistently accurate and reliable service when used to convey a particular material through a tubing segment of given physical characteristics, its accuracy and reliability can significantly change if a tubing segment having different physical characteristics is substituted, or if a material having different flow characteristics is conveyed.

It is an object of this invention to provide a flow control method and device for a material delivery system, the method and device having a consistently high degree of speed, accuracy, and reliability, independent of the particular physical characteristics of the associated delivery system and any changes which may therein occur.

SUMMARY OF THE INVENTION

To achieve this and other objects, the invention provides a method and associated device which are usable in association with virtually any fluid delivery system. The method and device quickly and consistently deliver materials in precise amounts and are not significantly effected by the various factors which, alone or in combination, can unexpectedly introduce metering errors in the associated system.

The method and device which embody the features of the invention, follow four basic operative steps. In the first step, material is conveyed into a collection container until a predetermined weight amount is collected. The predetermined weight amount is less than the desired finished or end-point weight amount by a selected initial weight offset amount.

In the second step, additional material is conveyed into the container for a predetermined fixed time period. During this step, the method and device measure the incremental weight amount of material which is conveyed during the fixed time period. In doing so, the method and device test the associated fluid delivery system to make a preliminary determination of its specific flow characteristics. The method and device then control subsequent delivery of material based upon this determination.

More particularly, in the third step, the method and device compare the desired end-point weight amount to the weight amount of material present in the container after the second step. The difference constitutes the present weight offset amount.

In the fourth step, additional material is conveyed into the collection container for a calculated time period. The length of the calculated time period reflects the specific flow characteristics of the system determined during the second step.

More particularly, in accordance with the invention, the length of the calculated time period represents the product of the fixed time period employed in the second step multiplied by the quotient of the present weight offset amount obtained in the third step and the incremental weight amount conveyed during the second step.

The third and fourth steps are repeated until the then-existing weight amount equals or exceeds the desired end-point weight amount.

In one preferred embodiment, in each repetition of the third and fourth steps, the calculated time period and corresponding incremental weight amount collected during the preceding iteration are used to derive the new calculated time period.

The method and device which embody the features of the invention readily adapt themselves to the specific flow characteristics of the associated flow system. In so doing, the method and device can deliver the desired precise amounts of materials independent of the particular flow characteristics of the fluid delivery system or the nature of materials being conveyed.

The method and device which embody the features of the invention provide for the fast, accurate and reliable delivery of precise amounts of materials. The speed, accuracy, and reliability of the method and device are not significantly effected by differences in flow tubing dimension, by differences in pump operation, or by the physical characteristics of the material conveyed.

Other features and advantages of the invention will become apparent upon reviewing the following, more detailed description, the drawings, and the appended claims.

Before explaining the embodiments of the invention in detail, it is to be understood that the invention is not limited in its application to the details of the construction and to the arrangement of components as set forth in the following description or as illustrated in the accompanying drawings. The invention is capable of other embodiments and of being practiced and carried out in various ways. Furthermore, it is to be understood that the phraseology and terminology employed are for the purpose of description and should not be regarded as limiting.

DESCRIPTION OF THE PREFERRED EMBODIMENTS

Figure 1:
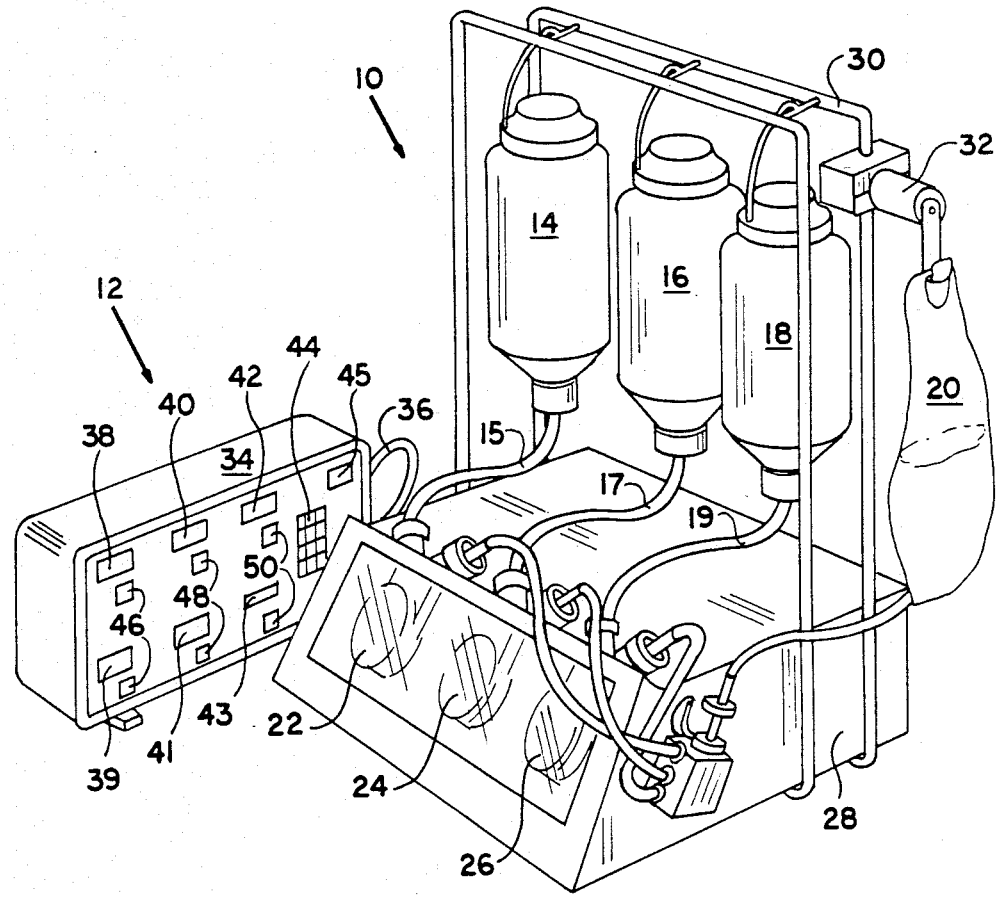
FIG. 1 is a perspective view of a fluid transfer device having a pump control system which embodies the features of the invention.

A fluid transfer device 10 having a pump control system 12 which embodies the features of the invention is shown in FIG. 1. In use, the pump control system 12 serves to convey a desired amount of fluid from one or more supply containers 14, 16, and 18 into a collection container 20.

While the pump control system 12 which embodies the features of the invention can be used in diverse environments, in the illustrated embodiment, the associated device 10 is used to compound different hyperalimentation solutions from up to three supply containers 14, 16, and 18 into the collection container 20 for intravenous delivery to a patient. In this respect, except for the particulars of the pump control system 12 to be described, the device 10 is similar in general operation to the one disclosed in Miller et al, U.S. patent application Ser. No. 391,759, now U.S. Pat. No. 4,513,796 filed June 24, 1982, and entitled, HIGH SPEED BULK COMPOUNDER.

In use, the device 10 first conveys solution from the first source container 14 into the collection container 20 until a desired amount is delivered. The device 10 then conveys desired amounts of solution in sequence from each of the remaining second and third source containers 16 and 18. The result is a desired final mix of solutions in the collection container 20.

It is the purpose of the pump control system 12 to assure that only the desired amount of each solution is quickly, accurately, and reliably conveyed into the collection container 20 from the supply containers 14, 16, and 18.

Each supply container 14, 16, and 18 communicates with the collection container 20 through a fluid transfer conduit, respectively 15, 17, and 19, which is preferably flexible tubing or the like. Fluid transfer is accomplished by pumps, respectively 22, 24, and 26, which are operatively connected to the conduits 15, 17, and 19 between each supply container 14, 16, and 18 and the receiving container 20. The pumps 22, 24, and 26 can be of any positive fluid pumping type. Preferably, however, they are peristaltic pumps for use in sterile applications, as shown in FIG. 1.

As also shown in FIG. 1, the device 10 includes a pump module 28, on which the peristaltic pumps 22, 24, and 26 are mounted. The supply containers 14, 16, and 18 are also suspended by hangers from a support bracket 30 on the pump module 28. The pump module 28 also includes a weight sensor or detector 32, such as a conventional load cell, strain gauge or the like, on which the receiving container 20 is suspended.

As shown in FIG. 1, the device 10 also includes a control module 34 which receives and supplies control signals from the pump module 28 through a control cable 36. The control module 34 includes, for each of the supply containers 14, 16, and 18, a display, respectively 38, 40, and 42, which shows the desired volume of each solution which is to be conveyed into the collection container 20, along with a display, respectively 39, 41, and 43, which shows the specific gravity of such solution being conveyed. A display 45 shows the volume amount of solution in the collection container 20.

The control module 34 also includes a keyboard 44 and associated data entry buttons 46, 48, and 50, through which the operator can enter the desired volume and specific gravity data into the displays 38, 40, and 42.

Figure 2:
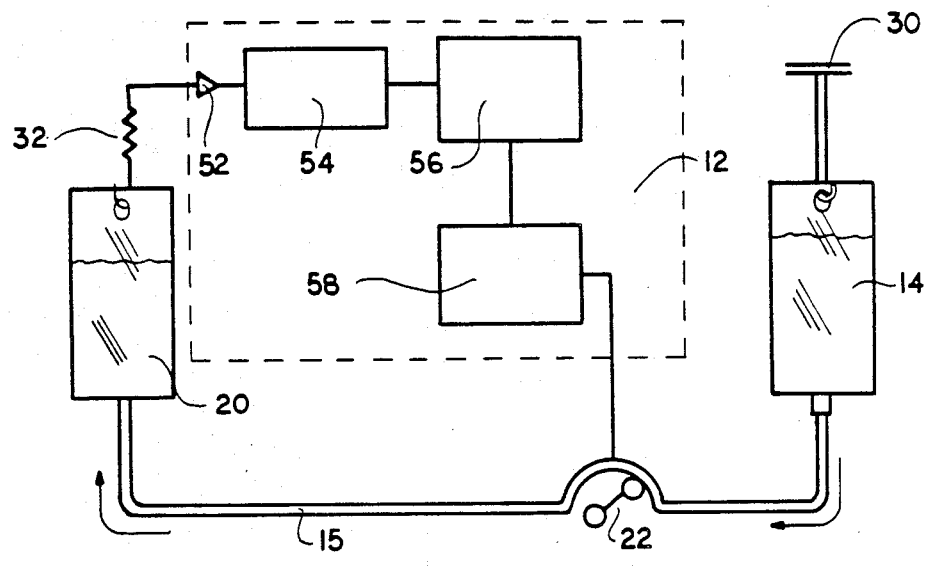
FIG. 2 is a diagrammatic view of the device and the associated pump control system.

As shown diagrammatically in FIG. 2, weight-indicative voltage signals are developed by conventional means by the weight sensor 32. These signals are conveyed to an amplifier 52 and an analog-to-digital converter 54. The weight-indicative voltage signals are fed through the amplifier 52 and converter 54 and are thereby converted by conventional means to digital weight-indicative signals.

The pump control system 12 includes a weight evaluation circuit 56, which receives the weight-indicative digital signals, and a pump operation circuit 58, which receives the output signals of the weight evaluation circuit 56 and drives the selected pump 22. In FIG. 2, the selected pump is pump 22 associated with supply container 14 and flow tubing segment 15.

Figure 3:
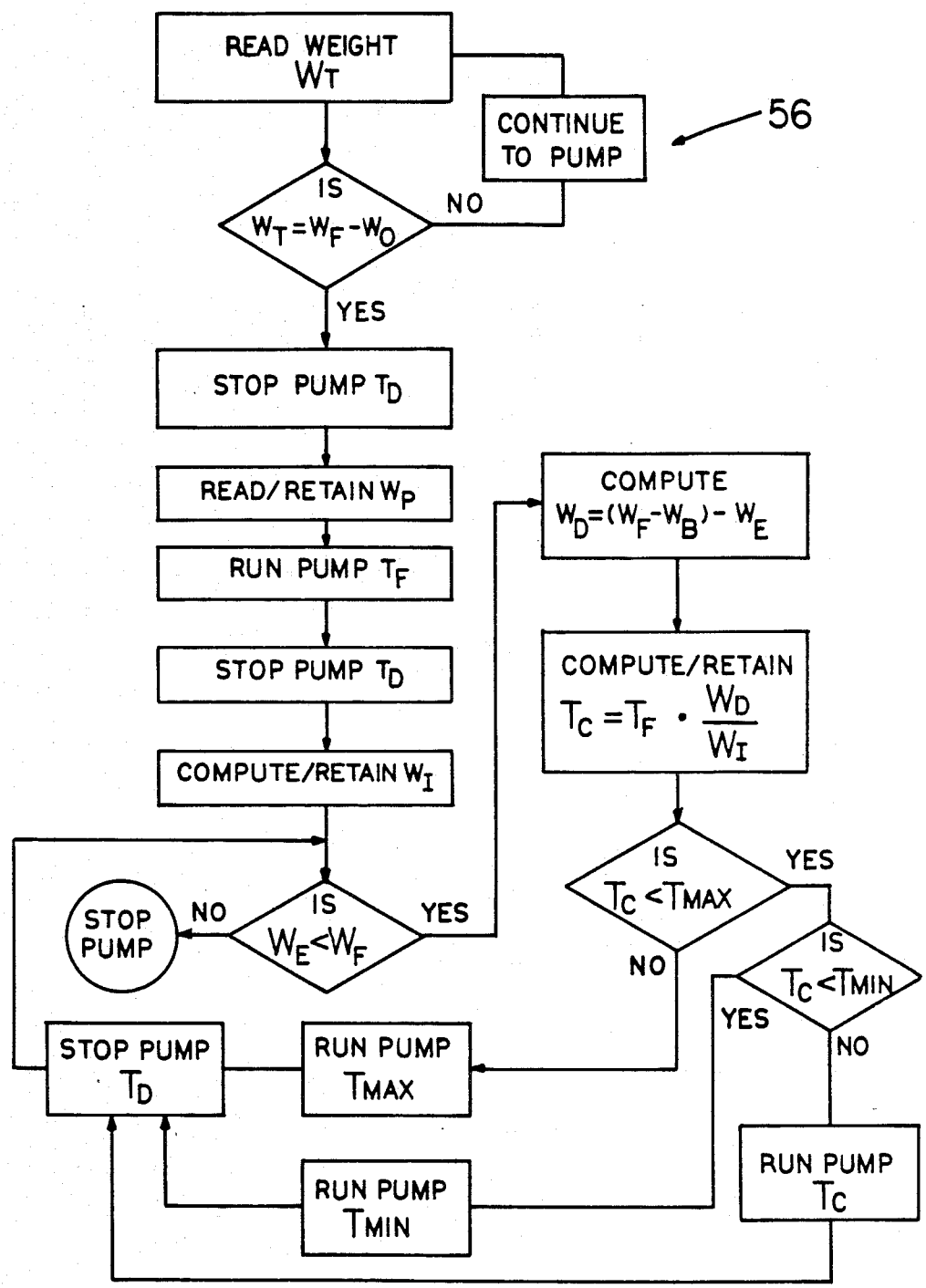
FIG. 3 is a flow diagram of one preferred embodiment of the weight evaluation circuit which forms a part of the pump control system of the invention.

Attention is now directed to FIG. 3, where a flow diagram of a preferred embodiment of the weight evaluation circuit 56 is shown.

As shown in FIG. 3, the selected pump 22 is initially operated in a continuous mode. During this mode, material is continuously conveyed from the associated supply container 14 into the collection container 20. The weight evaluation circuit 56 continuously monitors the weight amount of material ($W_T$) present in the collection container 20.

When the weight amount of material in the collection container 20 equals a predetermined weight amount ($W_p$), the continuous mode ceases and an intermittent pumping mode begins.

In accordance with an aspect of the invention, the predetermined weight amount $W_p$, at which the active pump 22 is switched from the continuous to the intermittent mode, equals the desired end-point weight amount ($W_F$) minus a selected initial offset amount ($W_O$); i.e., $W_p = W_F - W_O$, as shown in FIG. 3.

Once in the intermittent mode, as shown in FIG. 3, the active pump 22 is preferably initially stopped for a predetermined time delay interval ($T_D$) to allow the weight sensor 32 to stabilize and provide an accurate weight-indicative output signal. The then-existing weight, which will be at or near $W_p$, is latched and retained in the weight evaluation circuit 56.

The active pump 22 is next operated for a predetermined fixed time period ($T_F$). During the fixed time period $T_F$, an incremental weight amount ($W_I$) of material will be conveyed into the collection container 20. This incremental amount $W_I$ represents the difference between the weight of the container 20 at the beginning of the time period $T_F$ and the weight of the container 20 at the end of the time period $T_F$.

In accordance with the invention, the fixed time period $T_F$ is preferably purposely selected so that the incremental weight amount $W_I$ collected is less than the selected initial weight offset amount $W_O$; i.e., $W_I < W_O$. The end-point weight amount $W_F$ is therefore purposely not the target of the circuit 56 at this stage of the intermittent mode.

After the fixed time period $T_F$ has elapsed, the active pump 22 is again stopped. Preferably, another time delay ($T_D$) follows to allow the weight sensor 32 to again stabilize.

In accordance with the invention, the incremental weight amount $W_I$ which is collected during the fixed time period $T_F$ is latched and retained by the circuit 56 for later use. In particular, this data is used to precisely control the subsequent delivery of material to the collection container 20 until the desired end-point weight amount $W_F$ is reached.

The then-existing weight amount ($W_E$) of material present in the collection container 20 is now compared to the desired end-point weight amount $W_F$. If the then-existing weight $W_E$ is less than the desired end-point weight amount $W_F$ a present weight difference amount ($W_D$) is derived.

Preferably, to control the amount by which the circuit 56 can overshoot the desired end-point weight amount $W_F$, the end-point weight amount $W_F$, to which the existing weight amount $W_E$ is compared, is offset by a small overshoot prevention weight amount ($W_B$). Therefore, preferably, $W_D = (W_F - W_B) - W_E$, as shown in FIG. 3.

Based on the data latched and retained in preceding steps, the weight evaluation circuit 56 next calculates a new time period ($T_C$) during which the active pump 22 will next be operated to convey additional material into the collection container 20. In accordance with the invention, this calculated time period $T_C$ represents the product of the predetermined fixed time period $T_F$, employed during the first initial stage of the intermittent mode, multiplied by the quotient of the present weight difference amount $W_D$ and the incremental weight amount $W_I$ collected during the fixed time period $T_F$, i.e., $T_C = T_F(W_D/W_I)$, as shown in FIG. 3.

It has been discovered that, regardless of the particular physical dimensions or elasticity of the tubing; regardless of the particular characteristics of the pump; and regardless of the particular specific gravity or density of the material being conveyed, the ratio between the change in weight amount and the corresponding pumping interval remains essentially constant for a given tubing segment, a given pump, and a given material.

Therefore, in accordance with the invention, the weight evaluation circuit 56 initially operates the active pump 22 for the fixed time period $T_F$ and measures the initial incremental weight amount $W_I$ as a prelude to deriving later, more precise control signals.

More particularly, realizing that, for a given flow system, the relationship between weight amount conveyed over time remains relatively constant, the length of any subsequent time period ($T_C$) required to convey a desired increment weight amount of material ($W_D$) is computed by the evaluation circuit 56 as follows:

$$W_I/T_F \approx W_D/T_C$$

Therefore $$T_C \approx T_F(W_D/W_I),$$

as shown in FIG. 3.

Preferably, as shown in FIG. 3, the weight evaluation circuit 56 will not operate the active pump 22 for a time period which is less than a predetermined minimum ($T_{MIN}$) or exceeds a predetermined maximum ($T_{MAX}$), regardless of the magnitude of the calculated time period $T_C$ derived by the circuit 56 based upon then-existing conditions.

The minimum time period $T_{MIN}$ serves to prevent stalling of the pump due to control signals of insufficient magnitude. The maximum time period $T_{MAX}$ serves, like the overshoot weight offset $W_B$, to control the amount by which the circuit 56 can overshoot the desired end-point weight amount $W_F$.

As shown in FIG. 3, then, once the calculated time period $T_C$ is derived, the circuit 56 compares $T_C$ both to the predetermined minimum time period $T_{MIN}$ and to the maximum time period $T_{MAX}$. If the calculated time period $T_C$ exceeds the maximum time period $T_{MAX}$, the active pump 22 is operated only for the maximum time period $T_{MAX}$. If the calculated time period $T_C$ is less than the maximum time period $T_{MAX}$, the active pump 22 is operated for either the calculated period $T_C$ or the minimum time period $T_{MIN}$, whichever is greater.

The active pump 22 is operated either for the maximum time period $T_{MAX}$, or the calculated time period $T_C$, or the minimum time period $T_{MIN}$, as appropriate. After another preferred time delay $T_D$, the then-existing weight amount $W_E$ is again compared to the desired end-point weight amount $W_F$. If the then-existing weight amount $W_E$ equals or exceeds the desired end-point weight amount $W_F$, further operation of the active pump 22 is terminated. A new active pump 24, or 26 is selected and the heretofore described steps are repeated in their entirety.

However, if $W_E < W_F$, another comparison of the present weight $W_E$ to the end-point weight $W_F$, preferably adjusted by the overshoot prevention amount $W_B$, is made to derive another incremental weight amount $W_D$. Another incremental time period $T_C$ is calculated, based now upon the existing incremental weight amount $W_D$ needed to obtain the desired end-point $W_F$. Again, in accordance with the invention, the length of this new calculated time period $T_C$ represents the product of the initial fixed time period $T_F$ multiplied by the quotient of the now existing weight offset amount $W_D$ and the initial incremental weight amount $W_I$.

The sequence of the preceding paragraph is repeated until the then-existing weight amount $W_E$ equals or exceeds the desired end-point weight amount $W_F$.

Figure 4:
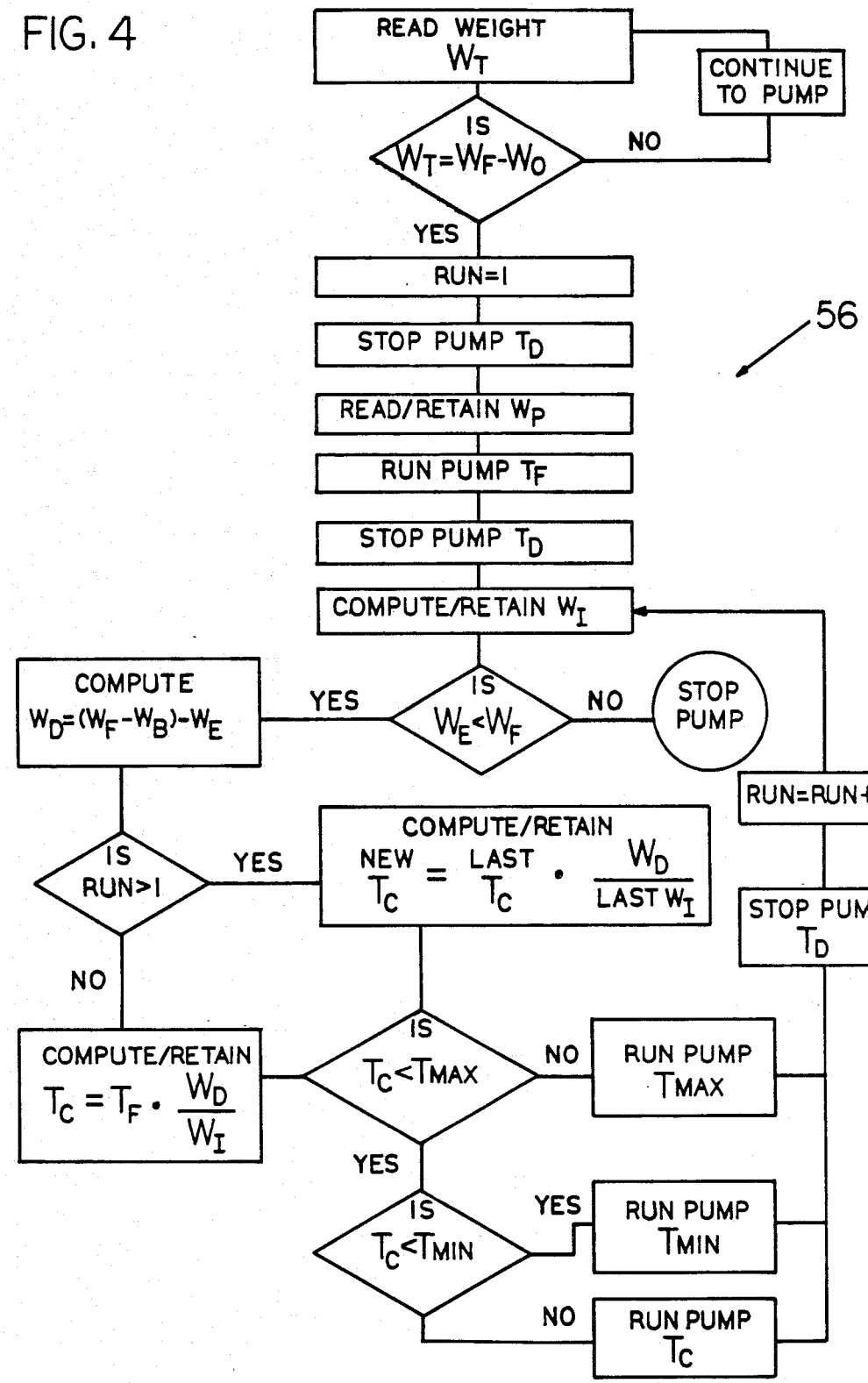
FIG. 4 is a flow diagram of another preferred embodiment of the weight evaluation circuit.

Another preferred embodiment is shown in FIG. 4. This embodiment is identical to the one shown in FIG. 3 and as heretofore described, except that, in each reiteration, the calculated time period $T_C$ and the corresponding incremental weight increase observed during the preceding iteration are used in place of $T_F$ and $W_I$ to calculate the new time period $T_C$. In this embodiment, then, the circuit 56 is constantly adapting itself to the most recently observed flow characteristics of the device 10.

More particularly, as shown in FIG. 4, during the first iteration (when RUN=1), the calculated time period $T_C$ represents the product of the fixed time period $T_F$ and the quotient of the present weight offset amount $W_D$ and the first incremental weight amount $W_I$. Both $W_I$ and $T_C$ are retained by the circuit 56.

In subsequent iterations (when RUN>1), as shown in FIG. 4, the new calculated time period (New $T_C$) represents the product of the preceding calculated time period (Last $T_C$) and the quotient of the present weight offset amount $W_D$ and the preceding incremental weight amount (Last $W_I$).

The pump control system 12 as just described may be variously operated. In the illustrated embodiment, in which the system 12 is used to precisely control the delivery of hyperalimentation solutions, the following system parameters can be used:

| | |
|---|---|
| Initial Weight Offset Amount ($W_O$) | 20 grams |
| Predetermined Time Delay Interval ($T_D$) | 750 milliseconds |
| Fixed Time Period ($T_F$) | 500 milliseconds |
| Overshoot Prevention Weight Offset ($W_B$) | 1 gram |
| Maximum Pump Time Period ($T_{MAX}$) | 750 milliseconds |
| Minimum Pump Time Period ($T_{MIN}$) | 250 milliseconds |

EXAMPLE

The pump control system 12 having the above listed system parameters was used to control delivery of various hyperalimentation solutions, and its speed, accuracy, and reliability were compared to the following conventional compounding methods:

(1) Transfer using only gravity flow, without the use of pumps (hereafter referred to as Gravity);

(2) Transfer using a commercially available vacuum pumping unit (hereinafter referred to as Vacuum); and (3) Transfer by conventional peristaltic pumps, using a commercially available three-station volumetric pumping device which does not utilize the system 12 of the invention (hereafter referred to as Conventional Pump).

The volumetric delivery accuracy was calculated from gravimetric and specific gravity data. The results are shown in the following Table 1.

TABLE 1

| Volumetric Delivery Accuracy | |
|---|---|
| Method | Mean % Volumetric error ± SD |
| System 12 | 0.45 ± 0.32 |
| Vacuum | 1.11 ± 1.00 |
| Gravity | 2.79 ± 1.54 |
| Conventional Pump | 5.12 ± 5.65 |

Table 1 demonstrates that the system 12 which embodies the features of the invention is more accurate than any of the conventional methods studied.

The mean time required to compound a patient-specific, three-component hyperalimentation formulation using the system 12 and each of the conventional methods was also calculated. The results are summarized in the following Table 2.

TABLE 2

| Patient Specific Formula Compounding Time Required to Transfer Varied Amounts of Amino Acid, 50% Dextrose, and Water to an Empty Final Container (Three-Component Transfer) | |
|---|---|
| Method | Mean Time ± SD Minutes |
| System 12 | 1.15 ± 0.05 |
| Conventional Pump | 7.22 ± 0.38 |
| Vacuum | 9.62 ± 0.32 |
| Gravity | 23.40 ± 1.92 |

Table 2 demonstrates that the system 12 which embodies the features of the invention was significantly the fastest method to compound three-component formulations.

In addition to being both more accurate and faster, Table 1 and Table 2 demonstrate that the system 12 was more reliable than any of the other methods studied, by virtue of having the lowest standard deviation (SD).

The above Example clearly demonstrates the superiority of the system 12 which embodies the features of the invention, in terms of speed, accuracy, and reliability.

Various features of the invention are set forth in the following claims.

We claim:

1. A method of collecting a desired end-point weight amount of a material in a collection container in which the desired end-point weight amount can be different each time the method is performed, said method comprising the consecutive steps of:

(a) receiving a signal indicating the desired end-point weight amount, (b) calculating a predetermined weight amount by subtracting a fixed offset weight amount from the desired end-point weight amount, (c) conveying the material into the collection container and weighing the material until said predetermined weight amount is collected, (d) conveying for an initial fixed time period an initial incremental weight amount of material into the container, the initial incremental weight amount being less than the fixed offset weight amount, (e) calculating a present weight offset amount by subtracting the then existing weight amount of material in the container from the desired end-point weight amount, (f) calculating a calculated time period by multiplying the initial fixed time period by the quotient of the present weight offset amount and the initial incremental weight amount, (g) conveying additional material into the collection container for said calculated time period, and (h) repeating steps (e) through (g) until the then existing weight amount equals or exceeds the desired end-point weight amount.

2. A method of collecting a desired end-point weight amount of a material in a collection container in which the desired end-point weight amount can be different each time the method is performed, said method comprising the consecutive steps of:

(a) receiving a signal indicating the desired end-point weight amount, (b) calculating a predetermined weight amount by subtracting a fixed offset weight amount from the desired end-point weight amount, (c) conveying the material into the collection container and weighing the material until said predetermined weight amount is collected, (d) conveying for an initial fixed time period an initial incremental weight amount of material into the container, the initial incremental weight amount being less than the weight fixed offset weight amount, (e) calculating a present weight offset amount by subtracting the then existing weight amount of material in the container from the desired end-point weight amount, (f) calculating a calculated time period by multiplying the initial fixed time period by the quotient of the present weight offset amount and the initial incremental weight amount, and comparing the calculated time period to a fixed maximum time period, and (g) conveying additional material into the collection container for the lesser of the calculated time period and the fixed maximum time period, (h) comparing the then existing weight amount of material in the container to the desired end-point weight amount to derive a new weight offset amount, (i) should the new weight offset amount be greater than zero, calculating a new calculated time period the length of which represents the product of the last-calculated time period multiplied by the quotient of the new weight offset amount and the incremental weight amount conveyed during step (g), (j) conveying additional material into the collection container for said new calculated time period, and (k) repeating steps (h) through (j) until the then existing weight amount equals or exceeds the desired end-point weight amount.

3. A method of collecting a desired end-point weight amount of a material in a collection container in which the desired end-point weight can be different each time the method is performed, said method comprising the consecutive steps of:

(a) receiving a signal indicating the desired end-point weight amount, (b) calculating a predetermined weight amount by subtracting a fixed offset weight amount from the desired end-point weight amount, (c) conveying the material into the collection container and weighing the material until said predetermined weight amount is collected, (d) conveying for an initial fixed time period an initial incremental weight amount of material into the container, the initial incremental weight amount being less than the fixed offset weight amount, (e) calculating a present offset weight amount by subtracting the then existing weight amount of material and a fixed overshoot prevention amount from the desired end-point weight amount, (f) calculating a calculated time period by multiplying the initial fixed time period by the quotient of the present weight offset amount and the initial incremental weight amount and comparing the calculated time period to both a fixed maximum time period and a fixed minimum time period, (g) conveying additional material into the collection container for said calculated time period when the calculated time period is less than the maximum time period and greater than the minimum time period, conveying additional material into the collection container for the minimum time period when the calculated time period is less than the minimum time period, and conveying additional material into the collection container for the maximum time period when the calculated time period exceeds the maximum time period, and (h) repeating steps (e) through (g) until the then existing weight amount equals or exceeds the desired end-point weight amount.

4. A method of collecting a desired end-point weight amount of material in a collection container in which the desired end-point weight can be different each time the method is performed, said method comprising the consecutive steps of:

(a) receiving a signal indicating the desired end-point weight amount, (b) calculating a predetermined weight amount by subtracting a fixed offset weight amount from the desired end-point weight amount, (c) conveying the material into the collection container and weighing the material until the said predetermined weight amount is collected, (d) conveying for an initial fixed time period an initial incremental weight amount of material into the container, the initial incremental weight amount being less than the fixed offset weight amount, (e) calculating a present weight offset amount by subtracting the then existing weight amount of material in the container and a fixed overshoot prevention weight amount from the desired end-point weight amount, (f) calculating a calculated time period by multiplying the initial fixed time period by the quotient of the present weight offset amount and the initial incremental weight amount, and comparing the calculated time period to a fixed minimum time period, (g) conveying additional material into the collection container for the greater of the calculated time period and the minimum time period, (h) comparing the then existing weight amount of material in the container to the desired end-point weight amount and calculating a new weight offset amount, (i) should the new weight offset amount be greater than zero, calculating a new calculated time period, the length of which represents the product of the calculated time period multiplied by the quotient of the new weight offset amount and the incremental weight amount delivered during the calculated time period, and comparing the new calculated time period to the fixed minimum time period, (j) conveying additional material into the collection container for the greater of the new calculated time period and the fixed minimum time period, and (k) repeating steps (h) through (j) until the then existing weight amount equals or exceeds the desired end-point weight amount.

5. A method according to claim 1 or 3 or 2 or 4 and further including, between said steps (c) and (d), the further step of terminating the conveyance of material into the collection container for a fixed delay time period.

6. A method according to claim 1 or 3 or 2 or 4 and further including, between said steps (d) and (e), the further step of terminating the conveyance of material into the collection container for a fixed delay time period.

7. A method according to claim 6 and further including, between said steps (c) and (d), the further step of terminating the conveyance of material into the collection container for a fixed delay time period.

8. A method according to claim 1 or 3 and further including in step (c), prior to weighing, the step of terminating the conveyance of material into the collection container for a delay time period, and wherein said step (g) includes after said conveying, the step of terminating the conveyance of material into the collection container for said delay time period.

9. A device for collecting a desired end-point weight amount of a material in a collection container in which the desired end-point weight can be different each time the device operates, said device comprising
first means for receiving an input signal indicating the desired end-point weight amount for a single operation of the device,
second means for conveying the material into the collection container until a predetermined weight amount is collected, the predetermined weight amount being less than the desired end-point weight amount by a selected initial weight offset amount,
third means for sensing the weight of material in the collection container,
fourth means for conveying for an initial fixed time period an initial incremental weight amount of material into the container, the initial incremental weight amount being less than the selected initial weight offset amount,
fifth means for comparing the then existing weight amount of material in the container to the desired end-point weight amount to derive a present weight offset amount,
sixth means for calculating a calculated time period, the length of which represents the product of the initial fixed time period multiplied by the quotient of the present weight offset amount and the initial incremental weight amount,
seventh means for conveying additional material into the collection container for the calculated time period, and
eighth means for sequentially operating said fifth through seventh means until the then existing weight amount of material in the container equals or exceeds the desired end-point weight amount.

10. A device according to claim 9
wherein said fifth means includes means for reducing the desired end-point weight amount by a selected overshoot prevention weight amount to derive an adjusted desired end-point weight amount and for comparing the existing weight amount to the adjusted desired end-point weight amount to derive the present weight offset amount.

11. A device for collecting a desired end-point weight amount of a material in a collection container in which the desired end-point weight amount can be different each time the device is operated, said device comprising:
first means for receiving an input signal indicating the desired end-point weight for a single operation of the device,
second means for conveying the material into the collection container until a predetermined weight amount is collected, the predetermined weight amount being less than the desired end-point weight amount by a selected initial weight offset amount,
third means for sensing the weight of material in the collection container,
fourth means for conveying for an initial fixed time period an initial incremental weight amount of material into the container, the initial incremental weight amount being less than the selected initial weight offset amount,
fifth means for comparing the then existing weight amount of material in the container to the desired end-point weight amount to derive a present weight offset amount,
sixth means for calculating a calculated time period, the length of which represents the product of the initial fixed time period multiplied by the quotient of the present weight offset amount and the initial incremental weight amount,
seventh means for conveying another incremental weight amount of material into the collection container,
eighth means for comparing the then existing weight amount of material in the container to the desired end-point weight amount to derive a new weight offset amount,
ninth means operative should the new weight offset amount be greater than zero, for conveying additional material into the collection container for a new calculated time period, the length of which represents the product of the last-calculated time period multiplied by the quotient of the new weight offset amount and the incremental weight amount delivered during the last-calculated time period, and
tenth means for sequentially operating said eighth and ninth means until the then existing weight amount of material in the container equals or exceeds the desired end-point weight amount.

12. A device according to claim 11
wherein at least one of said fifth means and said eighth means includes means for reducing the desired end-point weight amount by a selected overshoot prevention weight amount to derive an adjusted desired end-point weight amount, and
wherein, in the one of said fifth and eighth means, the then-existing weight amount is compared to the desired end-point weight amount to derive the weight offset amount.

13. A device according to claim 9 or 11
wherein said sixth means includes means for comparing the calculated time period to a predetermined maximum time period and conveying said seventh means includes means for additional material into the collection container for the calculated time period when the calculated time period is less than the predetermined maximum time period, otherwise conveying additional material into the collection container for the predetermined maximum time period.

14. A device according to claim 9 or 11
and further including means for comparing the calculated time period to a predetermined minimum time period and conveying additional material into the collection container for the calculated time period when the calculated time period is greater than the predetermined minimum time period, otherwise conveying additional material into the collection container for the predetermined minimum time period.

15. A device according to claim 9 or 11
and further including means for comparing the calculated time period to both a predetermined maximum time period and a predetermined minimum time period, and conveying additional material into the collection container for the maximum time period when the calculated time period exceeds the maximum time period, conveying the additional material into the collection container for the minimum time period when the calculated time period is less than the minimum time period, and conveying additional material into the collection container for the calculated time period when the calculated time period is less than the maximum time period and greater than the minimum time period.

* * * * *